United States Patent Office 3,555,130
Patented Jan. 12, 1971

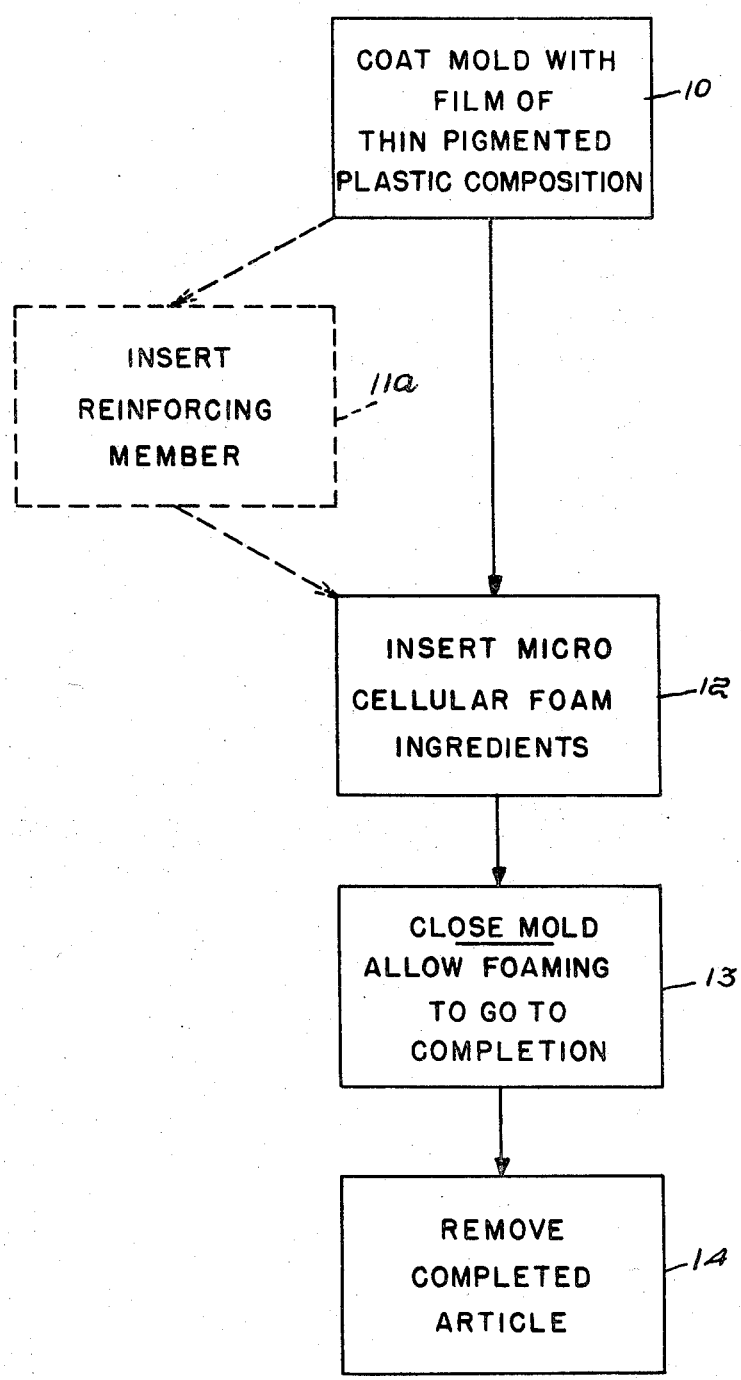

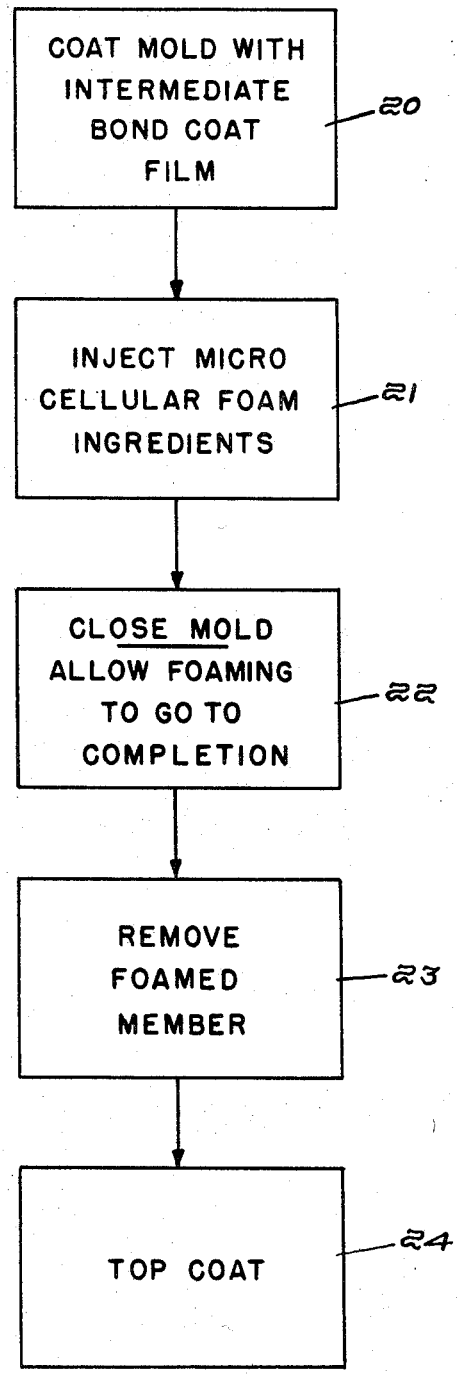

3,555,130
FORMING PIGMENTED INTEGRALLY BONDED COVERINGS ON ARTICLES OF MICROCELLULAR URETHANE FOAM
Seymour S. Feuer, Bloomfield Hills, Mich., and Richard D. Rhodes, Jr., and Allan F. Torres, Dover, N.H., assignors to Davidson Rubber Company Incorporated, Dover, N.H., a corporation of New Hampshire
Filed Aug. 29, 1966, Ser. No. 575,759
Int. Cl. B29h 7/20; B29d 27/00; B29c 5/02
U.S. Cl. 264—45                    5 Claims

ABSTRACT OF THE DISCLOSURE

A method of producing a molded article of microcellular urethane foam having an integral urethane skin comprising spraying at least a portion of the mold wall with a thin non-supporting layer of a vinyl/acrylic polymer dispersed in an organic liquid carrier, injecting a foamable microcellular urethane formulation into the mold, closing the mold and foaming the urethane composition such that the foam forms an integral microcellular urethane skin that is strongly bonded to the vinyl/acrylic copolymer coating.

---

This invention pertains to a method for forming integrally bonded skins or coverings on articles formed from urethane foams, especially those that are commonly called microcellular urethane foams. It has particular utility in the manufacture of padded-safety automobile trim components such as arm rests, topper pads, and sun visors.

In the past few years, the automotive industry has turned to the use of padded-safety trim components comprising a polyvinyl chloride skin filled with a urethane foam that is foamed in place to give a well-bonded integral structure. See, for example, the trim components disclosed in U.S. Patent No. 3,123,403. The acceptance of such components has been because inter alia this type of construction permits a wide latitude in styling and color, which are much desired particularly in automobiles of American manufacture.

A procedure has recently been developed in Europe for the manufacture of such urethane foam components whereby they are formed in a single step with a continuous skin thus avoiding the necessity of separately forming a vinyl shell or skin. In this procedure the urethane foaming composition, whether a prepolymer or one-shot system, is so prepared and the molding conditions are so controlled, as to have the foaming compositions form on its outsurfaces an integral skin or covering that is apparently smooth and continuous to the naked eye. Such integral-skin foamed urethane articles are referred to as "microcellular foams."

Urethane foams of this type when exposed to light discolor severely. In the European market the colors predominately used are black and deep red. The hiding power of the pigments is sufficient to prevent light-discoloring from being too much of a problem, but for American automobile parts where a wide range of color, shades and metallic tints are required, this tendency to discolor has prevented acceptance of the microcellular foam articles.

The present invention is addressed to this problem, and solves it by the application in situ of a coating over the skin of the microcellular foam that is not appreciably degraded by light.

Urethane foams are characterized by the fact that they have a tendency to tenaciously adhere to any surface they contact while undergoing formation such that special molds, such as silicone rubber molds, or special mold release agents must be used. On the other hand, once a microcellular foam article is complete, the surface is exceptionally chemically inert and resistant to solvent penetration so that conventional top coating procedures cannot be used, e.g. spray coating, because the coatings do not bond and readily crack and peel off.

In the present invention, the ability of the urethane foam to bond to a wide variety of materials when undergoing reaction is utilized to obtain a well bonded covering coating, usually of a non-urethane base coating material.

In brief compass, this invention is a process of manufacturing an article of microcellular urethane foam having integrally formed thereon a skin of the same chemical composition as that of the foam, which skin is intimately coated with a film of plastic material of a chemical composition dissimilar from that of the foam. The process comprises coating a mold cavity having a suitable release surface thereon and the configuration desired with a thin fluid film of the plastic material, solidifying the film coat as by the evaporation of a carrier solvent, injecting a microcellular foamable urethane composition therein, closing the mold, allowing the foaming reaction to go to completion under conditions that are such with respect to the chemical composition of the foam to produce a thin skin of the foaming material around the foam that is non-porous to the naked eye while at the same time bonding the film coating to the urethane skin, and thereafter removing the completed article from the mold.

The outer skin which is attached to the urethane skin can be pigmented so the article is substantially complete as removed from the mold or it can be an intermediate bond coating which is susceptible to being top coated by the usual procedures such as by spraying or dipping. Also, as is customary, metal or plastic inserts or attaching members can be placed in the mold prior to the foaming step. The coating that is placed within the mold usually will be a thermoplastic material, such as an acrylic. Generally speaking, it will have a thickness in the order of 0.1 to 0.5 mil. Some or complete solidification of the skin before foaming is desirable in order to prevent strike-through.

As is known, the microcellular foams are formed by selecting the urethane foaming ingredients, of either the polyether or polyester type, so that they generally have a high exothermic reaction temperature. The temperature of the mold walls are controlled to produce the desired skin thickness as well as to retard the action of the blowing agent so that only a small amount of or no foaming occurs at the surface of the mold. (See: "New Method for Producing Microcellular Polyether Urethane Rubber," Rubber Age, May 1966, pages 76 et seq.).

While the densities of the foam in articles of the type disclosed in U.S. Pat. No. 3,123,403 are in the order of 5 pounds per cubic feet, the densities of the microcellular foams are normally substantially higher, in the order of 10 to 40 pounds per cubic feet, in order to secure good skin formation and a relatively fine skin structure.

This invention will become clear from the following description made with reference to the examples and to the drawings attached hereto, in which:

FIG. 1 is a schematic illustration of methods of carrying out the process of this invention, and FIG. 2 is a schematic illustration of an embodiment where an intermediate bond coat is applied to the urethane foam article within the mold.

EXAMPLES

Suitable pigmented coating formulations that can be used to produce an article that is complete, except for removal of flash, inspection, etc., are nitrocellulose, alkyl and acrylic based formulations. They are preferably compounded to be quite flexible and extensible. Specific ones that have been successfully used are Bee Chemical's (Chicago, Ill.) vinyl acylics: Medium Turquoise Metallic, No. 26537; Medium Blue Metallic, No. 26526; and Medium Red Metallic, No. 26540. A formulation that can be used as an intermediate bond coat is Bee Chemical's Clear XR–46425.

A suitable urethane quasi-prepolymer system that can be used is (parts by weight):

Prepolymer:
| | |
|---|---|
| TDI 80/20 [1] | 93.0 |
| Crude MDI [2] | 93.0 |
| Primary capped triol [3] | 92.5 |

Activator:
| | |
|---|---|
| Primary capped triol | 450.0 |
| Aliphatic diol (90 M.W.) [4] | 40.0 |
| Aliphatic diol (2000 M.W.) [5] | 25.0 |
| Freon-11 (Du Pont) | 27.5 |
| Amine catalyst [6] | 10.0 |

[1] Toluene diisocyanate—80% of the 2–4 isomer, 20% of the 2–4 isomer.
[2] Methylene diisocyanate (Mobay Chemical's Mondur-MR).
[3] Dow Chemical's CP–3001, 3000 molecular weight.
[4] 1–4 butane diol.
[5] Wyandotte Chemical's P–2010.
[6] 33% triethylene diamine in dimethylol propane (Jefferson Chemical's Dabco LU–33).

A suitable one-shot urethane system is (parts by weight):

Base Resin:
| | |
|---|---|
| Primary capped triol | 450.0 |
| Aliphatic diol (90 M.W.) | 40.0 |
| Aliphatic diol (2000 M.W.) | 25.0 |
| Freon-11 | 27.5 |
| Amine catalyst | 10.0 |

Activator:
| | |
|---|---|
| TDI (80/20) | 87.5 |
| Crude MDI | 87.5 |

The coatings will normally be applied by spraying, although other methods such as brushing can be used. The urethane ingredients can be injected using known equipment such as that disclosed in U.S. Pat. No. 2,974,830.

The Medium Turquoise Metallic acrylic coating was applied to the interior surfaces of a mold of reinforced silicon rubber having the shape of the convertible front arm rest for the 1966 Chrysler (Part No. 2,440,836) in a thickness of approximately 0.2 mil (dry). The solvent was evaporated with a heat lamp following which the above quasi-prepolymer formula was injected in an amount sufficient to give a calculated density based on mold volume of 20 pounds per cubic foot. The initial mold wall temperature was approximately 95° F. The mold was promptly closed. After about 5 minutes, the mold was opened and the completed article removed.

FIG. 1 illustrates the above sequence of steps wherein at 10 the mold, which could be an aluminum mold or electroformed copper mold internally coated with known release agents, is coated with the pigmented top coat, has the urethane composition injected at 12, and is closed at 13 for the 5 minute period, with the finished article being removed at 14. The reference numeral 11a indicates an additional step that may occur in the practice of the invention, and is self-explanatory.

In FIG. 2 an alternative embodiment is shown wherein, only an intermediate bond coating is applied in situ to the foamed article. The bonding composition is applied to the mold having a suitable release surface at 20, the urethane ingredients are injected at 21, the mold is closed and the foaming reaction is allowed to go to completion at 22, the article is removed at 23, and then after inspection is top-coated in a conventional manner, e.g., spraying at 24 usually with a composition similar to that of the bond coat.

In the case where the coating applied to the mold requires an activator or catalyst to set it, a double nozzle electrostatic sprayer such as Eclipse Air Brush Company's Rap-Rod Electrostatic Paint Spray Gun with 50–6000 Power Pak can be used.

Having described this invention, what is sought to be protected by Letters Patent is succinctly set forth in the following claims.

We claim:
1. A method of producing a molded article of microcellular urethane foam having an integral urethane skin that is substantially non-porous to the naked eye wherein at least a portion of said microcellular urethane skin is coated with a thin non-supportive coating of vinyl/acrylic copolymer having a thickness in the order of 0.1 to 0.5 mil, said method comprising spraying at least a portion of the mold wall with a thin non-supporting layer of a vinyl/acrylic copolymer dispersed in an organic liquid carrier, drying the vinyl/acrylic layer to evaporate substantially all of the liquid carrier, injecting a foamable microcellular urethane formulation into the mold, closing the mold and foaming the urethane composition under conditions that are such with respect to the urethane composition that the urethane foam forms an integral microcellular urethane skin that is strongly bonded to the vinyl/acrylic copolymer coating.

2. The process of claim 1 wherein said vinylacrylic is pigmented to yield a colored surface.

3. The process of claim 1 wherein said vinylacrylic forms an intermediate bonding layer, and said article is subsequently top-coated.

4. The process of claim 1 wherein an insert is positioned within said mold cavity prior to the introduction of said urethane foam composition.

5. The process of claim 1 wherein said foam has an overall calculated density in the range of 10 to 40 pounds per cubic feet.

References Cited
UNITED STATES PATENTS

| | | | |
|---|---|---|---|
| 2,948,651 | 8/1960 | Waag | 264—45 |
| 2,950,505 | 8/1960 | Frank | 264—45 |
| 3,161,436 | 12/1964 | Hood | 264—46 |
| 3,210,782 | 10/1965 | Buist et al. | 264—45 |
| 3,286,004 | 11/1966 | Hill et al. | 264—45 |
| 3,390,214 | 6/1968 | Woods | 264—45 |

JULIUS FROME, Primary Examiner

L. GARRETT, Assistant Examiner

U.S. Cl. X.R.
264—46, 54